United States Patent
Addison, Sr.

(10) Patent No.: US 7,059,805 B1
(45) Date of Patent: Jun. 13, 2006

(54) PROCESS FOR ENVIRONMENTAL PACIFICATION OF DRILL CUTTINGS

(76) Inventor: Fred E. Addison, Sr., 615 Ridge Rd., Lafayette, LA (US) 70506

( * ) Notice: Subject to any disclaimer, the term of this patent is extended or adjusted under 35 U.S.C. 154(b) by 0 days.

(21) Appl. No.: 10/456,801

(22) Filed: Jun. 6, 2003

(51) Int. Cl.
*B09B 3/00* (2006.01)

(52) U.S. Cl. .................. 405/129.3; 175/64; 588/252

(58) Field of Classification Search .............. 175/66, 175/206, 64, 207; 588/252, 257; 405/129.25, 405/129.3
See application file for complete search history.

(56) References Cited

U.S. PATENT DOCUMENTS

| | | | | |
|---|---|---|---|---|
| 4,084,381 A | * | 4/1978 | Cain et al. | 405/266 |
| 4,161,411 A | * | 7/1979 | Sell et al. | 106/751 |
| 4,230,568 A | * | 10/1980 | Chappell | 405/129.3 |
| 4,895,665 A | * | 1/1990 | Colelli et al. | 210/710 |
| 5,200,033 A | * | 4/1993 | Weitzman | 159/47.1 |
| 5,210,112 A | * | 5/1993 | Shimoda et al. | 523/132 |
| 5,238,583 A | * | 8/1993 | Fortson | 405/129.27 |
| 5,260,502 A | * | 11/1993 | Fryer | 588/252 |
| 5,336,022 A | * | 8/1994 | McKennon et al. | 405/263 |
| 5,340,235 A | * | 8/1994 | Milliken | 405/129.3 |
| 5,346,549 A | * | 9/1994 | Johnson | 106/708 |
| 5,354,787 A | * | 10/1994 | Shimoda et al. | 523/132 |
| 5,372,460 A | * | 12/1994 | Ruehl | 405/129.3 |
| 5,401,312 A | * | 3/1995 | Hanst | 106/706 |
| 5,481,989 A | * | 1/1996 | Beeghly et al. | 110/344 |
| 5,484,533 A | * | 1/1996 | Crawford et al. | 210/660 |
| 5,542,977 A | * | 8/1996 | Hanst | 106/706 |
| 5,788,623 A | * | 8/1998 | Studer et al. | 588/256 |
| 5,830,831 A | * | 11/1998 | Chan et al. | 507/211 |
| 5,912,403 A | * | 6/1999 | Bilke | 75/773 |
| 5,931,773 A | * | 8/1999 | Pisani | 588/256 |
| 6,381,899 B1 | * | 5/2002 | McDole | 435/262 |
| 6,648,551 B1 | * | 11/2003 | Taylor | 405/129.25 |
| 6,695,077 B1 | * | 2/2004 | Szymocha et al. | 175/66 |
| 6,711,830 B1 | * | 3/2004 | Hensley et al. | 34/357 |
| 6,797,676 B1 | * | 9/2004 | Von Krosigk | 507/140 |

* cited by examiner

*Primary Examiner*—Gary S. Hartmann
(74) *Attorney, Agent, or Firm*—Joseph L. Lemoine, Jr.

(57) ABSTRACT

The process for environmental pacification of drill cuttings which contain drilling fluid residue is characterized by mixing said cuttings with dehydrated limestone coke ash in the presence of water. Upon mixing the drilling fluid residue becomes entrapped into a non-leaching solid. Following treatment of drill cuttings with dehydrated limestone coke ash the resulting product has particular use as a road or work area base in connection with a topping which includes calcium sulfate hemihydrates.

10 Claims, No Drawings

PROCESS FOR ENVIRONMENTAL PACIFICATION OF DRILL CUTTINGS

BACKGROUND

1. Field of the Invention

The invention herein disclosed relates to a method for on-site treatment of wet drill cuttings produced by earth-boring operations. In particular it relates to means for on-site dehydration and binding of potential detrimental liquids wetting such cuttings. With more particularity the method herein disclosed and claimed provides a means for pacification of potential detrimental liquids wetting such cuttings without the necessity of using a reserve pit, reinjection of the cuttings or transportation of the cuttings for off-site treatment or disposal. The method disclosed is particularly well suited for use at environmentally sensitive drilling locations, where "zero-discharge" regulations are applicable.

2. Description of Related Art

In the field of earth-boring operations cuttings from the borehole ("drill cuttings") are brought to the surface. Such cuttings are recognized to present environmental challenges. They may contain some oils and greases. When brought to the surface they will inevitably be wet with drilling fluid (commonly called "drilling mud" or simply "mud"). Said mud will more often than not contain a variety of substances which are considered detrimental to the environment. Some of these salts, such as chloride and other salts, may have been intentionally added to the mud to impart various properties, such as additional weight, thereto. The mud may have also picked up various substances while drilling through various downhole formations. What to do with cuttings wetted with substances that are considered detrimental to the environment presents the problem. The invention disclosed and claimed herein does not attempt to address the problem of radioactive cuttings, but is directed to "ordinary" cuttings, those which are wetted with drilling fluid containing substances considered detrimental to the environment, including but not limited to some hydrocarbon substances.

Prior art teaches various means to address this problem. In many applications the problem is addressed by use of a reserve pit. As those skilled in the art of drilling will be aware a reserve pit commonly constitutes a diked area, where not only drill cuttings, but other potentially contaminated solids and fluids are temporarily stored during drilling, but typically, by regulation, must be cleaned up at the conclusion of drilling. This method of addressing the problem has various limitations. Increasingly, in environmentally sensitive areas, use of reserve pits is prohibited. Physical limitations of a drilling site may also preclude use of a reserve pit. Even when use of a reserve pit is not otherwise precluded, pit closure and clean up presents many issues, including separation of hydrocarbons, water and solids and appropriate treatment, if possible, for disposal on-site or for transport, treatment and/or disposal at an approved disposal site.

Prior art also teaches that contaminated drilling cuttings may, in some cases, be disposed of by reinjection technology. As those skilled in the art will know this will generally comprise collection of the cuttings, grinding to a sufficiently small size so that they may be included in a slurry, and disposal of the cuttings by pumping the slurry into an earth bore, or a designated zone of an earth bore. Practice of this method involves use of an earth bore or a zone thereof, which is not always available. In reinjection care must be taken so that certain underground formations are not damaged. In certain areas reinjection is not permitted. Practice of the method involves use of substantial, relatively complex equipment, for which space may not always be available and constitutes an extra expense.

Prior art also discloses that wet, potentially contaminated drill cuttings may also be handled by transportation away from the drilling site, for treatment or disposal elsewhere, including but not limited to disposal at an authorized disposal facility. However, authorized treatment and/or disposal facilities are not always located nearby. While transportation for treatment and disposal even short distances poses increased expenses (including but not necessarily limited to shipping costs, increased fuel consumption, increased road maintenance, treatment and disposal fees), transportation long distances worsens the problem.

Prior art also teaches that drill cuttings may be washed clean of contaminants, after which they may be handled as an environmentally safe substance. While this method proposes a solution with respect to the drill cuttings themselves, it poses another, namely how to treat, dispose or otherwise handle the liquids which were used to wash them. Accordingly this proposed solution has not been generally accepted.

As exploration for minerals expands into a greater number of areas that have been declared environmentally sensitive areas, sometimes referred to as "zero-discharge" sites, which areas may be more remote from established transportation routes, none of the above means may be economically suitable for handling drill cuttings contaminated with drilling fluid. In such areas exploration for minerals cannot presently be conducted.

The invention described and claimed is directed to avoiding some of the shortcomings of each of the above described methods of handling drill cuttings contaminated with drilling fluids. In accordance with the invention, drill cuttings contaminated with drilling fluids may be treated effectively and economically, at the drilling site, by a process that binds the water of the drilling fluid and the contaminants therein into a solid structure which is sufficiently non-leaching to satisfy current environmental regulations. The treated drilling cuttings may be disposed of or used as a non-environmentally hazardous substance. They are disclosed to be particularly useful in the "permatizing" of a drilling location for subsequent mineral production therefrom.

SUMMARY OF THE INVENTION

The process herein described and claimed is principally by the novel step of using a dehydrated limestone coke ash to treat drill cuttings wetted with potentially contaminated drilling fluids. Dehydrated limestone coke ash is a by-product of combusting coke to produce heat energy therefrom. In many applications when coke is combusted, for the purpose of extracting energy, such combustion is conducted in a bed of fluidized crushed limestone. The purpose of the limestone is to absorb, and thereby minimize atmospheric emissions of sulphuric compounds, chiefly $SO_2$. The resulting ash is rich in CaO ("quicklime") and $CaSO_4$ ("anhydrite"). When dehydrated limestone coke ash is mixed with drilling cuttings wetted with potentially contaminated drilling fluids, said ash appears to "absorb" the water, dry the cuttings, and bind the water of the drilling fluids, along with various substances therein, into a solid substance which meets current environmental regulations. While no claim is made to the precise chemical or physical reaction that occurs when dehydrated limestone coke ash is mixed with drill cuttings wetted with potentially contaminated drilling fluids, the quicklime and anhydrite of the ash is believed to form calcium based hemihydrate and dihydrate gels which nucleate and grow by polymerization, thereby binding the water and contaminants therein in a solid, stable crystalline matrix which is sufficiently non-leaching to comply with most environmental standards. Accordingly the invention principally teaches mixing of cuttings wetted with potentially contaminated drilling fluids with a sufficient amount of dehydrated limestone coke ash to absorb and bind the liquids of said cuttings. The invention also teaches that drill cuttings so treated have particular utility, particularly as the base of a road or work site surfaced with calcium sulfate hemihydrates and/or dihydrates.

OBJECTS OF THE INVENTION

The main object of the invention is to provide a novel and improved method for environmental pacification of drill cuttings which have been contaminated with drilling fluids. Another object of the invention is to dehydrate drill cuttings by a means which binds said drilling fluids thereon into a stable solid which meets environmental requirements for use, after treatment, as a non-environmentally hazardous substance. Other objects of the invention relate to environmental pacification of drill cuttings without the necessity of utilizing reserve pit technology, reinjection technology, cuttings washing technology or transportation of drill cuttings off-site for treatment or disposal. Yet another object of the invention is to teach use of pacified cuttings as a base for a road or work area surfaced with calcium sulfate hemihydrates and/or dihydrates.

DESCRIPTION OF THE PREFERRED EMBODIMENT OF THE INVENTION

While the present invention will be described with reference to preferred embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. It is therefore intended that the present invention not be limited to the particular embodiments disclosed herein, but that the invention will include all embodiments (and legal equivalents thereof) falling within the scope of the appended claims.

In the preferred embodiment of the invention cuttings will typically be separated from drilling mud by conventional means. As those skilled in the art will know during drilling the mud is typically circulated continually from the surface to the bottom of the bore wherefrom it returns by different path (typically an annulus about the drill pipe) containing drill cuttings. As those skilled in the art will be familiar with in typical operations, upon return to the surface attempt will be made to remove solids (except for small size particles as may be necessary for increasing the weight of the mud) from the returning mud prior to recirculating it back down hole. As those skilled in the art will be aware, various equipment such as mud screens, shakers, desanders and centrifuges may be used to remove such solids, the principal component of which will be drill cuttings. The object of the process being to produce dual streams, one of mud cleaned of solids, the other stream being the removed solids, of which the principal component will be drilling cuttings, from which at least most of which the drilling fluids have been removed. However such solids, including drill cuttings will inevitably be wetted with some amount of drilling fluid. Said drilling fluid will inevitably contain a variety of substances that are considered environmentally hazardous, usually including salts, principally but not exclusively chloride salts, used to increase the weight of the drilling fluids. Also frequently included in drilling fluids are some heavy metals, and some oils, greases or other hydrocarbon contamination, which are also considered hazardous to the environment. Accordingly proper disposal of this drilling fluid contaminated with environmentally hazardous substances, is an issue. Even if the water of the drilling fluid was to be dried by evaporation that would only leave the environmentally hazardous substances on the drill cuttings.

In a typical drilling operation environmental pacification of drill cuttings can sometimes be done through use of reserve pit technology. However, use of reserve pits is prohibited in environmentally sensitive areas, called "zero-discharge" sites or zones. Alternative means of handling drill cuttings, by reinjection technology, washing technology or transportation for treatment and/or disposal away from the drilling site might be used, but has various disadvantages discussed above. It would be better if environmental pacification of drill cuttings could be conducted at the drilling site, by quick inexpensive means which does not generate additional waste hazardous to the environment but is bound into a stable, non-environmentally hazardous substance on location. The invention herein disclosed and claimed teaches such procedure. In addition thereto it teaches a procedure where the environmentally pacified drill cuttings may be used to permatize a drilling site.

The first step of the process is collecting the drill cuttings to be treated. While it is preferred that the cuttings be collected and treated while the cuttings remain initially wet with drilling fluid, that is not intended to be a limitation of the invention. The cuttings may be collected after they have been dried, as by evaporation. If they are collected after drying, water will have to be added during treatment hereinafter discussed.

The cuttings to be processed may be, or have been, wetted with either "water based" or "oil based" drilling muds. Both have sufficient water for necessary hydration of liquids, their solutes and particulate according to the invention herein disclosed and claimed. In the event insufficient water is present, if may be added, as discussed above.

The cuttings are preferably collected into a container or area which is separated from liquid contact with the ground prior to treatments. In the preferred embodiment of the invention this involves collection of the cuttings, while initially wetted with drilling fluid, into one or more "cutting boxes" which are available commercially. These are generally strong, liquid tight, open topped containers of steel construction. Particularly preferred are cutting boxes or the like which have one or more augers disposed therein, as this will facilitate agitation and mixing of granular substances hereinafter discussed. Also preferred are containers, such as cement mixing containers, which are rotatably disposed about an axis which includes a horizontal component, and may have vanes therein to facilitate agitation and mixing of granular substances. As those skilled in the art will appreciate various containers of many sizes, shapes or dispositions might be used. In fact no "container" as such may be used. It is possible, for instance, to collect cuttings to be treated in an earthen depression which is lined against passage of liquids therefrom. All that is necessary in the step of collecting is to collect the cuttings in a container or area where drilling liquids are prevented from discharge into the environment and which is sufficiently accessible for mechanical agitation of the cuttings by some means thereafter.

The next step of the invention is a step which may or may not be necessary depending on the condition of the cuttings to be treated. If the cuttings have been dried, as for instance by evaporation, adding water to the cuttings may be necessary. The presence of sufficient water as is necessary to dissolve soluble contaminants of the drilling fluid is necessary for incorporation of those contaminants into a non-leaching solid form as discussed hereafter. Therefore, if the cuttings have been dried sufficiently to cause soluble contaminants to precipitate onto the cuttings, sufficient water is added to re-dissolve them.

The next step of the invention involves adding a sufficient quantity of dehydrated limestone coke ash to wet drill cuttings so as to absorb drilling fluid contained thereon. As used herein limestone coke ash refers to the ash which is produced from combusting coke in a fluidized bed of limestone. The coke is combusted to extract heat therefrom. A disadvantage of combusting cokes can be sulfuric atmospheric emissions. In order to mitigate against such emissions the coke may be combusted in a fluidized bed of crushed limestone. While no claim is made to the precise means by which such combustion produces dehydrated limestone coke ash, it is believed that during combustion the limestone becomes decarbonized and produces CaO ("quicklime"). It is believed the quicklime reacts with $SO_2$ gases from combustion of coke and produces $CaSO_4$ ("anhydrite"). It is noted that combustion of coke in a bed of fluidized bed of crushed limestone produces two types of ash, a fly ash and a bed ash. While the fly ash typically has a greater percentage of quicklime than the bed ash, both are rich in quicklime and anhydrite. Both also contain some amount of uncalcined, or recarbonated, limestone. Relatively unique to this ash is the amount of quicklime that exists in the form of "free" form (as opposed to a bound form). In such product the amount of quicklime that exists in free form is typically greater than 18% (and can be 32% or more in fly ash). As contrasted with cement kiln dust, where the total amount of lime may be as high as 62%, only 10% or so of that total lime exists as quicklime (in "free" form).

Adding dehydrated limestone coke ash (either, or both, fly or bed ash) to drill cuttings wetted with drilling fluid is comprehended by the invention. While no precise claim is made to the manner in which dehydrated limestone coke ash is able to dehydrate said cuttings and bind oils, greases, chlorides and heavy metals contained in the drilling fluid into a stable solid, this is believed to occur because of the affinity of the quicklime and anhydrite to form hemihydrate and dihydrate gels which nucleate and grow into a crystalline lattice which incorporates both water and said contaminants.

As will be appreciated by those skilled in the art, there can be no precise formula for the amount of dehydrated limestone coke ash to be added to the drill cuttings to be treated, because the amount of water contained thereon is highly variable, depends on the size and shape of the cuttings, the type and condition of the drilling fluid separation equipment used at a particular location, and the working habits of the rig personnel. This having been said the ash is a very hydrophilic product which is capable of hydrating as much as 50 times its volume of water. It can also be said that while better is hoped for, and planned for, even very wet cuttings rarely comprise over 25% water by volume. Thus in a typical application, 4 to 5 cubic yards of dehydrated limestone coke ash is usually sufficient to treat about 150 barrels of drill cuttings. However that having been said, less may sometimes be sufficient, considerably more may be necessary if rig practices are not good and the drill cuttings are excessively wet. Rather than by precise quantitative calculation the amount of ash that is preferably added can be determined by simple field test, that being to fill a cup or the like with an admixture of cuttings and ash and invert same of a flat non-porous, non-absorbing surface, and remove the cup. If liquid does not flow from the mound then sufficient ash is considered to be present. Further drying is expected as the admixture cures or sets as will be discussed hereinafter discussed. On the other hand, if the admixture has been dried to the extent that the drill cuttings no longer cohere (the mound of cuttings no longer retain the shape of the cup, but "fall apart") then excess ash is present, and more wet cuttings may be added (although excess ash is harmless to the environment, and may in fact be desired if the end product is to be re-wetted at a later time to form integral slab or block).

The next step of the invention is mixing the ash with the drill cuttings. As those skilled in the art will appreciate, the step of adding ash to the drill cuttings and mixing the cuttings with the ash will frequently be conducted simultaneously, and will frequently involve agitating the cuttings as increasing quantities of ash are added until the admixture of cuttings and ash reaches a desired consistency which is generally described above, and in some cases may be more a matter of preference and experience than actual necessity. In the step of mixing it should be appreciated that the drill cuttings are typically heavy, granular and abrasive in nature. On the other hand the ash is a dry, powdery, hydrophilic substance that tends to clump easily in the presence of water. As suggested above, drill cutting boxes containing augers for agitating drill cuttings contained therein and concrete mixing machines are particularly preferred in practice of the invention. Many other mixing means appropriate for handling substances of the above-described characteristics will be known to those skilled in the art.

While the above discussion principally concerns itself to treating cuttings by batch process, those skilled in the art will realize that said discussion is equally applicable to continuous treatment of a stream of cuttings. For instance a stream of cuttings and ash could be channeled directly to a chamber with integral means, such as a screw auger. Accordingly continuous treatment of drill cuttings, by mixing with dehydrated limestone coke ash is comprehended by the invention.

Following mixing of drill cuttings and ash as aforesaid the admixture begins heating and curing (moisture is absorbed and converted into a gel). Within a few minutes the gel begins to harden into a solid. With the passage of additional time all of the gel is transformed into a solid. In some applications it may be desirable for complete hardening of the gel to occur before the cuttings are passed on for storage or reuse. In some applications it may be preferred to place the admixture at a location before complete solidification has occurred (such as when the cuttings are to be used as the base of a road or work area, and hardening in place is desirable). In applications where complete solidification is desired, the invention provides for a curing ("setting," "solidification" or "hardening") period of time. Although additional solidification may yet occur if the admixture is exposed to additional water, in the preferred embodiment of the invention, an overnight hardening period has been found more than sufficient for initial solidification to occur.

It should be understood that upon completion of the drying, the drill cuttings remain subject to further hydration if exposed to water. This actually makes use of the cuttings particularly preferred for certain applications, namely for forming beds for roads or work areas to be surfaced, particularly if said bed is surfaced with calcium sulfate hemihydrates and/or dihydrates. Namely, in such step, treated cuttings will be formed into a bed, compacted, then wetted. Compaction and wetting will cause the cuttings to cohere, although not as strongly as portland cements, better than gravel or non-cohered aggregate beds. Such bed is particularly well adapted for use with calcium sulfate hemihydrates and/or dihydrates surfacing, to which it appears to chemically bond when wetted. Such road (or work area), is particularly well suited for permatizing a drilling location. While such construction is not so durable as to be subject to public use, it is far more durable than most temporary constructions used at such locations, yet has the distinct advantage of being recoverable (by grinding) and reusable (by compaction and re-wetting) at a subsequent location.

It is thus to be appreciated that a process established in accordance with the principles and teachings of the present inventive disclosure constitutes an advancement in the field of art to which the invention pertains. While the above description contains many specificities, these should not be construed as limitations on the scope of the invention, but rather as an exemplification of preferred embodiments thereof. Accordingly, the scope of the present invention should be determined not by the embodiments illustrated, but by the appended claims and their legal equivalents.

What is claimed is:

1. A process for environmental pacification of drilling cuttings brought to the surface of the earth by earth-boring, said cuttings having drilling fluid residue thereon, comprising:
   a. collecting, at the surface of the earth, drilling cuttings brought to the surface of the earth by earth-boring operations;
   b. adding, at the surface of the earth, dehydrated limestone coke ash to said collected drilling cuttings; and,
   c. mixing, at the surface of the earth, said drilling cuttings and said dehydrated limestone coke ash in the presence of liquid comprising water.

2. The process of claim 1 wherein the dehydrated limestone coke ash contains at least 15 percent by weight calcium oxide.

3. The process of claim 2 wherein the dehydrated limestone coke ash contains at least 20 percent by weight calcium oxide.

4. The process of claim 3 wherein the dehydrated limestone coke ash contains at least 25 percent by weight calcium oxide.

5. The process of claim 4 wherein the dehydrated limestone coke ash contains at least 50 percent by weight calcium oxide.

6. The process of claim 1 wherein the dehydrated limestone coke ash is comprised of at least 15 percent quicklime by weight.

7. The process of claim 6 wherein the dehydrated limestone coke ash is comprised of at least 20 percent quicklime by weight.

8. The process of claim 7 wherein the dehydrated limestone coke ash is comprised of at least 25 percent quicklime by weight.

9. The process of claim 8 wherein the dehydrated limestone coke ash is comprised of at least 30 percent quicklime by weight.

10. The process of claim 1 further comprising the step of allowing sufficient time for the admixture of drill cuttings and dehydrated limestone coke ash to solidify before use thereof.

* * * * *